Patented June 21, 1927.

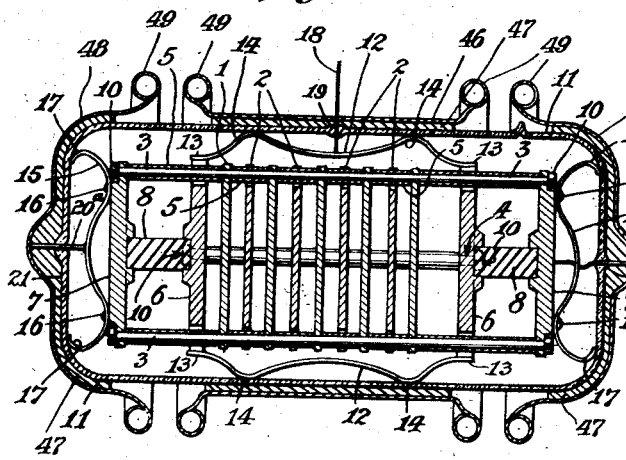

1,633,285

UNITED STATES PATENT OFFICE.

JOHN A. PROCTOR, OF LEXINGTON, MASSACHUSETTS, ASSIGNOR TO WIRELESS SPECIALTY APPARATUS COMPANY, OF BOSTON, MASSACHUSETTS, A CORPORATION OF NEW YORK.

HIGH-POTENTIAL ELECTRICAL CONDENSER.

Application filed February 1, 1921. Serial No. 441,628.

This invention relates to high potential electrical condensers for general use, such as in radio transmitters, power transmission lines and wherever high potential condensers are found necessary.

In condensers of the sheet or jar type now in use, the electrical losses where high voltages are used are comparatively great resulting in loss of efficiency; and also in heating and ultimate disintegration of the condenser, especially if not properly made. This heating is partly due to losses in the dielectric apparently arising from dielectric hysteresis or frictionally-impeded movements of the atoms of the dielectric due to electric flux through the latter, and partly because of brush or corona discharges in the medium surrounding such condensers.

The object of the present invention is to provide a construction in which the losses are at a minimum. In particular, the invention comprises a condenser in which the dielectric between the armatures or conducting plates is a vacuum of a certain nature and order to be specified. Briefly described, the condenser of this invention comprises a suitable casing, bulb or tube in which is mounted a condenser structure made up of spaced metallic plates, the air being exhausted from the tube to form between the plates a vacuum dielectric in which there is no appreciable loss in use due to gas ionization or to dielectric hysteresis.

In the accompanying drawing, Figure 1 is a sectional view illustrating one form of the invention.

Fig. 2 is a detail perspective view of the condenser plates showing the manner of mounting the same; and Fig. 3 is a perspective view with part of the casing broken away illustrating a modified form of the invention, i. e., a variable condenser.

Referring to Figs. 1 and 2, the condenser, in this particular form disclosed as an example, is made up of a series of metal plates 1, which, for purposes of convenience, may be called the "positive" plates, and a series of like metal plates 2, which, for purposes of convenience, may be called the "negative" plates, alternating with the plates 1. The plates 1 are mounted upon and electrically connected to a pair of metal conducting rods 3, while the plates 2 are mounted upon and electrically connected to a pair of metal conducting rods 4, the plates or armatures 1 and 2 being secured to and spaced on their respective rods by any suitable means such as the metal sleeves 5 concentrically arranged on the rods and abutting adjacent plates 1 and adjacent plates 2 respectively, so that all plates 1 and 2 are assembled together in the form of a stack.

At opposite ends of the series of plates 1 and 2, and to which the rods 4 are electrically connected, are two nickel members 6. These members 6 form supports for the plates 2 and their rods 4. The positive rods 3 as shown in Fig. 1 are longer than the negative rods 4, and project beyond the supports 6, and at their outer ends are fixed to and electrically connected to a second pair of nickel supports 7, while between each adjacent support 6 and 7 is an insulating separator 8 of any suitable insulating and dielectric material such as crystal quartz. The plates 1 and 2 and members 6 are provided with clearance notches 9 (Fig. 2), whereby they are spaced from the connecting rods to which they are not electrically connected. The rods 3 and 4 may be connected and secured to their supports 6 and 7 by any suitable securing arrangement such as the nuts 10. Thus a supporting structure is provided for mounting and holding the plates 1 and 2 in spaced relation. Surrounding the condenser structure above-described is a bulb, casing or tube 11, preferably of glass, from which air has been exhausted as more fully described hereinafter.

In order properly to space the condenser structure from the tube or casing 11 and in order properly to retain such condenser structure in position within the casing 11 without breaking or injuring the casing, the structure is resiliently or yieldingly supported in the casing against movement, in all directions. For this purpose, at opposite sides of the condenser are provided springs 12 comprising metal strips which are secured, at the points 13, in electrical contact with the nickel supports 6. Springs 12 at outer points 14 engage the wall of the casing 11, thus yieldingly supporting the condenser against lateral movement within its casing 11. In like manner, in order to mount the condenser yieldingly against longitudinal movement within its casing 11, a pair of springs 15 is provided, comprising metal strips connected at points 16 to the members 7. These springs 15 project outwardly and engage the casing 11 at points 17, whereby the condenser is yieldingly supported within the bulb or casing 11. One of the springs 12 (top, Fig. 1) constitutes part of the conductor for the set of plates 4 electrically connected to the members 6. A conductor 18 is connected to such upper spring 12, and constituting one terminal of the condenser, is brought out through a sealed joint 19 in casing 11. A second conductor 20 (right, Fig. 1) connected to one of the nickel members 7 constitutes the other terminal of the condenser. This second conductor 20 also is brought out through the casing 11 through a second sealed joint 19. The conductors 18 and 20 may be of platinum, if so desired (especially when casing 11 is of glass on account of the similar coefficients of expansion of glass and platinum), and in any instance any well-known seal (such as used with high vacuum devices such as X-ray tubes, thermionic devices and the like) may be used for bringing the same out and maintaining the high vacuum necessary in the present invention.

In order to insert or place a condenser structure of the character above-described within its casing 11, during construction one end of the casing 11, say the left end 21, is left open, so that the condenser structure with its positioning springs 12 and 15 may be inserted. In sealing up the end 21, it should be so done that the adjacent spring 15 will engage such end 21 at two points 17 as shown. After the end 21 is sealed up, a tube may be left extending into the bulb or casing 11, at some accessible point, through which tube the necessary high degree of exhaustion can be obtained, as is common practice in vacuum devices in general. After exhaustion, the tube through which the exhaustion has taken place may be melted from casing 11 and sealed up, in the usual manner.

The order of vacuum or exhaustion which exists in a condenser such as above described should be extremely high, such that no appreciable gas ionization takes place to cause losses while the condenser is in operation, which condition is obtained, for example, by a pressure of the order of a millionth of a millimeter. Such exhaustion may be obtained by any well-known means such as a Gaede or molecular pump, or Langmuir's condensation pump.

All materials inside the vacuum casing are to be suitably treated to remove gases (occluded or otherwise) according to any of the well-known processes in use for the production of high vacuum apparatus. Such treatment may consist, for example, in initially (before assembling in the casing) treating these materials to remove gases preliminarily, as by heat or other treatments. In addition, it is advisable, after assembling in the casing, to subject the contained materials to further treatment to remove any residual gases. This final treatment may consist of a bombardment of the materials from a heated filament which is located within the casing temporarily or otherwise. I prefer to use as a first treatment the well-known method of removing gases from metals consisting of the use of the Northrup high-frequency electrical furnace. In such case, my entire condenser, while undergoing its exhaustion, is placed within the field of a coil carrying high frequency current. This heats the metal parts inside the condenser-casing, thereby driving off and removing gases before the casing is completely exhausted and sealed off. The materials used in these vacuum condensers should be of such a nature that the gases may be easily removed by the above-described processes. Therefore, in constructing the condensers, nickel, tungsten, molybdenum or rolled steel should be used wherever possible in constructing all parts.

By the above construction and invention, a condenser in which the plates 1 and 2 are separated a centimeter can be constructed to stand a million volts. In such a condenser and with the vacuum dielectric of the order specified, the loss is practically zero, being limited to the minute Joulean losses in the metal plates and leads, and the minute losses in the dielectric surrounding the terminals, and the minute losses in the supporting dielectric 8 (Fig. 1).

In Fig. 3 is shown a form of variable condenser embodying the invention. This condenser comprises spaced fixed metal plates 25 mounted upon and electrically connected to metal rods 26. Fixed plates 25 are spaced from each other by any suitable means such as the metal sleeves 27. The rods 26 are in turn secured to metal end plates 28. Movable metal plates 29 are fixed at spaced distances apart, and in such position as to alternate with the spaced plates 25, to a metal shaft 30 journaled in insulators 31 fixed in the end plates 28 to insulate the two sets of plates from each other. The upper portions of end plates 28 are cut away, forming spaces 28ª, and the movable plates 29 are sufficiently spaced therefrom so that plates 29 in the position shown will have very little capacity effect therewith, allowing a wider range of capacity variation. Two springs 32 comprising metal strips are connected at points 33 to end plates 28 and engage the side walls of the enclosing air-tight glass bulb or casing 32ª at points 34 to support the condenser yieldingly against longitudinal movement.

The condenser of Fig. 3 is constructed of materials such as nickel, etc., for the reasons above stated and similarly treated, inserted within the bulb 32ª, sealed up and the air exhausted in the same manner as described in connection with the construction shown in Fig. 1. One terminal (that for the fixed plates 25) is a conductor 36 extending through and sealed in casing 32ª and connected to one of the two metal springs 32, connected to the metal plates 28, which, in turn, are electrically connected to fixed plates 25. The other terminal of the condenser (that for the movable plates 29) is a conductor 38 extending through and sealed in casing 32ª and connected to a spiral conducting coil 37 connected to one end of the metal shaft 30, but arranged to allow the free rotation thereof.

The left end of the shaft 30 terminates in a magnet 39 of suitable magnetic material such as iron, steel or nickel, supported in spaced relation to the end of the tube 32ª. This magnet has the poles 40 and 41. The encased condenser is supported in any suitable manner on a base 42. A horseshoe magnet 43, journaled in the support 42 at 44 and provided with an actuating knob 45, embraces the end of the non-magnetic casing 32ª adjacent to magnet 39. As magnet 43 is rotated, this rotation will be communicated to the variable condenser magnetically through the co-acting magnet 39, thus providing means for varying the capacity of the condenser without danger of impairing the high degree of vacuum necessary to this invention. Either of the magnets 39, 43 may be a soft iron or nickel armature if so desired.

Inasmuch as the movable plates 29 are unbalanced on their shaft 30 and tend to hang down under the influence of gravity in a position 180° from that shown in Fig. 3, the capacity of the condenser can also be varied by rotating the casing 32ª and consequently the fixed plates 25 around the longitudinal axis of the casing, the movable plates when hanging down under the effects of gravity remaining relatively stationary.

In order to prevent high losses in the glass due to the intense electric fields generated in high voltage condensers between points of different potential in contact with the glass as at the points 14 and 17 and leads 18, 20 and 20ª of Fig 1, there is provided a cylindrical metal shield or sheath 46 surrounding the outside of the casing insulation 11 opposite portions engaged by springs 12 and secured to the glass of the casing, preferably by cement 47. The shield 46 is at the potential of the springs 12, being electrically connected thereto by conducting terminal 18. In like manner, metal end caps 48 are placed over the ends of the casing opposite portions engaged by springs 15. The caps may be secured to the outside of the insulation 11 by cement 47. The caps 48 are at the potential of the adjacent springs 15, one of the caps being electrically connected to one spring 15 by means of conducting terminal 20, and the other cap by means of a conductor 20ª. The caps 48 preferably are spaced a sufficient distance from shield 46 to prevent discharges between the two under normal conditions by reason of service differences of potential. Furthermore, the edge portions of both shield 46 and caps 48 are deflected or bent outwardly away from the glass 11 of the casing and rolled up, forming round tubular edges or electrodes 49 spaced from the glass. The parts 46 and 48 eliminate dielectric strain and heating of and losses in the insulating material, by providing a path for the electric field, which path is outside of the casing and spaced from the glass thereof. The round edges eliminate brushing. The metal shields also mechanically reenforce and strengthen the insulating portion 11 of the encasing means for the armature stack.

A construction like that last above-described for preventing losses may be applied to the construction of Fig. 3.

It is to be understood that the invention is not limited to the embodiments and features specifically shown and described herein, but that such embodiments and features are subject to changes and modifications without any departure from the spirit of the invention.

I claim:—

1. An electrical condenser of the vacuum dielectric type which comprises a glass casing for the condenser plates and dielectric, leads from the plates sealed through the glass of the casing; and metallic means mounted outside the casing and connected to the condenser leads and arranged to provide a path for the electric field outside of the casing in order to eliminate dielectric strain.

2. An electrical condenser which comprises a glass casing containing a gaseous dielectric at a pressure of the order of a millionth of a millimeter; a metallic structure of conducting condenser members located within said casing; and means for preventing the metallic structure from injuring the glass casing which consists of spring supports for said structure interposed between the structure and the casing.

3. A high duty condenser comprising a supporting frame; a plurality of armatures of substantial superficial area arranged face to face in a stack in spaced relation to one another in said supporting frame; said frame including means for insulating armatures of opposite potential from one another; an hermetically sealed casing including a member consisting of structural insulating material supporting and enclosing said frame and the armatures, the space inside said casing and between the faces of the armatures being filled with a non-conducting gas at a pressure of the order of a millionth of a millimeter; and terminal leads connected to portions of said condenser stack of high potential difference, said terminal leads being hermetically sealed thru said insulating casing-member.

4. In a high duty condenser, the combination with an assembly of condenser elements including armatures separated from one another by a dielectric medium; of a protecting structure for said condenser assembly including at least three members mechanically secured together, one of said members consisting of structural insulating material and the other two of said members consisting of conducting metal; said metal members being electrically connected respectively to opposite potential portions of the condenser assembly, the electric field between which portions would affect said insulating member; and at least one of said metal protecting members extending toward and relatively close to the other metal protecting member, establishing a path for the electric condenser field which path lies substantially outside the space occupied by said insulating member thereby reducing heating losses therein.

5. In a high duty condenser, the combination with an assembly of condenser elements including armatures separated from one another by a dielectric medium; of a casing for said assembly including a member of structural insulating material and a member of metal, the latter being electrically connected to a portion of the enclosed condenser assembly; a second metal member mounted outside said casing adjacent said insulating member; said insulating member having a concavo-convex portion concave to the condenser assembly; and said outside metal member being spaced from the convex outer face of said insulating member but having a concavity facing the convex outer face of said insulating member and conforming generally to the convex configuration thereof; a terminal-lead extending from a portion of the enclosed condenser assembly of high potential difference from the portion to which said metal casing member is connected, the electric field between which condenser assembly portions would affect said insulating casing member, said terminal-lead extending thru said insulating member and electrically connected with said outside metal member; and said outside metal member extending in a direction toward but not contacting with said metal casing member of opposite polarity, establishing a path for the electric field of the condenser which path lies substantially outside the space occupied by said insulating casing member thereby reducing heating losses therein.

6. In a high duty condenser, the combination with an assembly of condenser elements including armatures separated from one another by a dielectric medium; of a casing for said condenser assembly including a metal portion electrically connected to the enclosed condenser assembly as a circuit terminal therefor, said casing including also an insulating portion mechanically connected with said metal casing member and having a concave portion facing a portion of the enclosed condenser assembly which is at a high potential difference from the portion to which said metal casing member is connected; and a terminal-lead connected to the portion of the condenser assembly which faces said concave portion of said insulating member, said terminal-lead extending, substantially remote from said metal casing portion, thru the space formed by the concavity of the insulating member between the insulating member and the enclosed condenser assembly, and thru the insulating member itself, to the exterior of the enclosing casing as the other circuit terminal of the condenser.

7. In a high duty electric condenser, the combination with an assembly of condenser elements, including armatures separated from one another by a dielectric medium; of a casing for said assembly including a member consisting of structural insulating material and extending around the condenser intermediate portions thereof of high potential difference; said casing including also at least two metal members secured to said insulating member in positions respectively near said assembly portions of high potential difference; said two metal members respectively being electrically connected to such assembly portions; said metal casing portions being located at substantially separated portions of said insulating member and thereby insulated from one another; and said metal casing portions being exteriorly exposed as circuit terminals for the enclosed assembly-portions of high potential difference.

8. A high potential electrical condenser comprising an assembly of condenser elements including armatures separated from one another by a dielectric medium; a casing enclosing said assembly and including a member consisting of structural insulating material extending around the assembly intermediate portions thereof of high potential difference; said casing including also two metal members cemented to said insulating portion in widely spaced relation to one another, electrically connected respectively to opposite potential portions of the condenser assembly which is enclosed by them and by the insulating portion of the casing, and exteriorly exposed as circuit terminals of the enclosed condenser assembly.

9. In a high duty condenser the combination with an assembly of condenser elements including armature plates separated from one another by a dielectric medium; of an enclosing casing for said assembly including a member of structural insulating material extending around the edges of the armature plates, said casing including also at least two members of metal electrically connected respectively to portions of the enclosed condenser assembly of high potential difference; said metal members being mounted out of contact with one another at different portions of said insulating member and thereby insulated from one another but extending relatively toward one another outside of said insulating member thereby establishing a path for the electric field between them which path lies substantially outside the space occupied by said insulating casing member.

JOHN A. PROCTOR.